(12) United States Patent
Gualandri et al.

(10) Patent No.: US 7,711,522 B2
(45) Date of Patent: May 4, 2010

(54) SYSTEMS AND METHODS FOR MONITORING A MACHINE

(75) Inventors: J. Joseph Gualandri, Metamora, IL (US); Milton R. Long, Franklin, TN (US)

(73) Assignee: Caterpillar Inc., Peoria, IL (US)

( * ) Notice: Subject to any disclaimer, the term of this patent is extended or adjusted under 35 U.S.C. 154(b) by 416 days.

(21) Appl. No.: 11/513,124

(22) Filed: Aug. 31, 2006

(65) Prior Publication Data

US 2008/0059081 A1    Mar. 6, 2008

(51) Int. Cl.
*G06F 17/40* (2006.01)
*G06F 19/00* (2006.01)

(52) U.S. Cl. ............ 702/187; 340/870.01; 340/870.05; 340/870.07; 340/870.16; 702/1; 702/33; 702/34; 702/127; 702/189; 705/1; 705/7; 705/11; 705/30; 705/400

(58) Field of Classification Search ............ 340/426.19, 340/3.1, 5.1, 425.5, 426.1, 426.18, 426.24, 340/426.25, 825, 870.01, 870.05, 870.07, 340/870.16; 705/500, 32, 418, 1, 4, 7, 11, 705/28, 30, 35, 36 R, 400, 417; 377/14, 377/1, 6, 13, 15, 16; 701/1, 19, 35, 50; 702/1, 702/33, 34, 81, 127, 182, 187, 188, 189
See application file for complete search history.

(56) References Cited

U.S. PATENT DOCUMENTS

| | | | |
|---|---|---|---|
| 2,883,255 A * | 4/1959 | Anderson | 346/34 |
| 3,362,217 A * | 1/1968 | Rush et al. | 73/112.01 |
| 6,025,774 A | 2/2000 | Forbes | |
| 6,064,970 A | 5/2000 | McMillan et al. | |
| 6,141,610 A | 10/2000 | Rothert et al. | |
| 6,141,629 A | 10/2000 | Yamamoto et al. | |
| 6,249,217 B1 | 6/2001 | Forbes | |
| 6,347,302 B1 | 2/2002 | Joao | |
| 6,502,080 B1 | 12/2002 | Eichorst et al. | |
| 6,552,648 B1 | 4/2003 | Rick et al. | |
| 6,594,597 B1 | 7/2003 | Schoch | |
| 6,629,031 B2 | 9/2003 | Gustavsson et al. | |
| 6,694,234 B2 | 2/2004 | Lockwood et al. | |
| 6,868,386 B1 | 3/2005 | Henderson et al. | |
| 6,889,127 B2 | 5/2005 | Gustavsson et al. | |
| 6,952,680 B1 | 10/2005 | Melby et al. | |
| 6,987,964 B2 | 1/2006 | Obradovich et al. | |
| 7,117,169 B2 * | 10/2006 | Zara et al. | 705/28 |
| 7,209,863 B2 * | 4/2007 | Fukuda et al. | 702/186 |
| 2002/0016655 A1 | 2/2002 | Joao | |
| 2002/0077944 A1 | 6/2002 | Bly et al. | |

(Continued)

FOREIGN PATENT DOCUMENTS

EP    1 096 430 A3    6/2001

(Continued)

*Primary Examiner*—Edward R Cosimano
(74) *Attorney, Agent, or Firm*—Finnegan, Henderson, Farabow, Garrett & Dunner (57) ABSTRACT

Systems and methods are provided for monitoring a machine. In one implementation, a system for monitoring the machine includes a monitoring server in communication with a machine. The monitoring server receives data from the machine, estimates, based on the received data, an operating condition of the machine, and estimates a depreciation value of the machine based on the operating condition.

14 Claims, 6 Drawing Sheets

U.S. PATENT DOCUMENTS

| | | |
|---|---|---|
| 2002/0184062 A1 | 12/2002 | Diaz |
| 2003/0023610 A1* | 1/2003 | Bove et al. .................. 707/101 |
| 2003/0055677 A1* | 3/2003 | Brown et al. .................. 705/1 |
| 2004/0094622 A1 | 5/2004 | Vismara |
| 2004/0095237 A1* | 5/2004 | Chen et al. .................. 340/506 |
| 2004/0138790 A1 | 7/2004 | Kapolka et al. |
| 2004/0177032 A1 | 9/2004 | Bradley et al. |
| 2005/0015186 A1 | 1/2005 | Kelly et al. |
| 2005/0038581 A1 | 2/2005 | Kapolka et al. |
| 2005/0060070 A1 | 3/2005 | Kapolka et al. |
| 2005/0065678 A1 | 3/2005 | Smith et al. |
| 2005/0177337 A1 | 8/2005 | Beyer et al. |
| 2005/0216903 A1 | 9/2005 | Schaefer |
| 2006/0025907 A9 | 2/2006 | Kapolka et al. |
| 2006/0049246 A1 | 3/2006 | Lee |
| 2006/0206273 A1* | 9/2006 | Reichel et al. .................. 702/27 |
| 2007/0094055 A1* | 4/2007 | Nakayama et al. .............. 705/5 |
| 2007/0192473 A1* | 8/2007 | Fukuda et al. ............... 709/223 |
| 2008/0000959 A1* | 1/2008 | Faoro et al. .................. 235/375 |
| 2008/0001739 A1* | 1/2008 | Faoro et al. .............. 340/568.1 |
| 2008/0001771 A1* | 1/2008 | Faoro et al. .................. 340/679 |
| 2008/0059339 A1 | 3/2008 | Gualandri |
| 2008/0121684 A1* | 5/2008 | Gualandri .................. 235/375 |

FOREIGN PATENT DOCUMENTS

| | | |
|---|---|---|
| JP | 8 258670 | 10/1996 |
| WO | WO 03/077205 A2 | 9/2003 |
| WO | WO 2004/092857 A2 | 10/2004 |

* cited by examiner

SYSTEMS AND METHODS FOR MONITORING A MACHINE

TECHNICAL FIELD

The present disclosure relates generally to monitoring a machine, and more particularly, to systems and methods for monitoring a machine in order to determine an estimated depreciation value of the machine.

BACKGROUND

A modern machine (e.g., a fixed or mobile commercial machine, such as a construction machine, fixed engine system, marine-based machine, etc.) may be leased to a customer from a machine owner with financing handled by a financial entity. Typically, at the beginning of the lease, the customer enters into an application agreement, which specifies the type of application the machine is agreed to be subject to during the lease (e.g., mining, construction, types of environments, etc.), the agreed number of hours of machine use for the term of the lease, and any other restrictions or requirements. Further, the application agreement typically specifies penalties for overuse of the machine and/or use of the machine in a manner that is inconsistent with the terms of the application agreement.

In some situations, the customer may use the machine in excess of the agreed upon number of hours of use during the lease. In other situations, the customer may use the machine for an application that was not specified in the application agreement. Based on the terms of the application agreement, the financial entity that leased the machine may have expected the machine to have a greater value at the end of the lease term. As a result of overuse or use of the machine in an environment not specified in the application agreement, the depreciated value of the machine may be less than expected.

During the term of the lease, the financial entity is typically unaware of the present value of the machine because it is costly and impractical to expend the resources necessary to perform regular inspections of all leased machines. Further, due to the overuse of the machine or use of the machine that is inconsistent with the application agreement, the financial entity may have to charge the customer a penalty. Even though the penalty is specified in the application agreement, due to the passage of time since the customer entered into the agreement, the penalty might be an unexpected cost. After being charged the penalty, the customer might come away from the transaction with a negative impression of the experience.

The financial entity would like to provide the customer with a better experience in order to encourage repeat business and customer goodwill. For example, the financial entity would prefer to inform the customer of the overuse of the machine during the term of the lease. At that time, the customer may then have the option of adjusting the amount of use of the machine in order to use the machine in a manner that is more consistent with the terms of the application agreement. Alternatively, the customer may indicate that the current level of use of the machine is required for the remainder of the lease term. In such a situation, the financial entity would have an option available to renegotiate the rate of the lease for the remainder of the lease term with the customer. By renegotiating the rate, the customer would not incur an unexpected and likely greater penalty at the end of the lease term. However, since the financial entity is unaware of the overuse of a leased machine and/or use of the machine that is inconsistent with the application agreement, these options are not available.

One method of tracking and managing physical assets is described in U.S. Pat. No. 6,952,680 B1 (the '680 patent), which issued to Melby et al. on Oct. 4, 2005. The '680 patent describes a system that gathers, analyzes, and delivers information relating to assets, such as a fleet of industrial equipment. Although the system of the '680 patent may analyze the information relating to the assets and schedule asset maintenance as required, the system nevertheless has several disadvantages. For example, the system of the '680 patent does not determine whether a machine has been used in excess of an application agreement. Further, the system of the '680 patent does not use data collected from a machine to notify a customer of overuse and a penalty that will be incurred if the level of overuse continues to the end of a lease term.

The disclosed system and methods are directed to overcoming one or more of the problems set forth above.

SUMMARY OF THE INVENTION

In one aspect, the present disclosure is directed to a system for monitoring a machine. The system may include a monitoring server in communication with the machine. The monitoring server may receive data from the machine, estimate, based on the received data, an operating condition of the machine, and estimate a depreciation value of the machine based on the operating condition.

In another aspect, the present disclosure is directed to a method for monitoring a machine. The method may include receiving, over a network, data from the machine and estimating, based on the received data, an operating condition of the machine. The method may also include estimating a depreciation value of the machine based on the operating condition.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
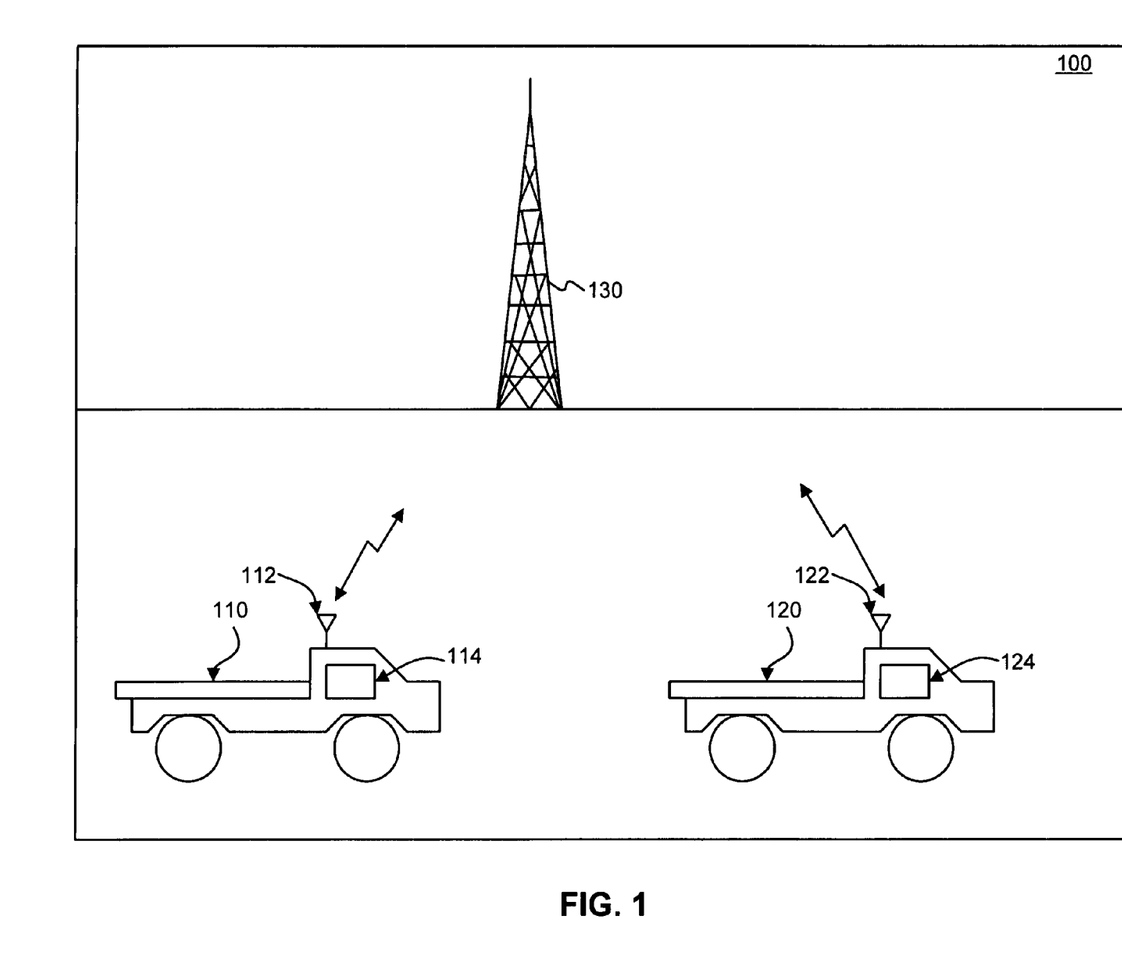
FIG. 1 illustrates an exemplary environment for collecting machine data, consistent with an embodiment.

FIG. 1 illustrates an exemplary environment 100 for collecting machine data from a machine, consistent with one disclosed embodiment. As shown in FIG. 1, environment 100 may include machine 110, machine 120, and radio tower 130.

The term "machine" refers to a fixed or mobile machine that performs some type of operation associated with a particular industry, such as mining, construction, farming, etc., and operates between or within work environments (e.g., construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving machines, mining machines, backhoes, material handling equipment, farming equipment, marine vessels, aircraft, and any type of movable machine that operates in a work environment. As shown in FIG. 1, machine 110 and machine 120 are hauler-type machines. The type of machine illustrated in FIG. 1 is exemplary and not intended to be limiting. It is contemplated by the disclosed embodiments that environment 100 may implement any number of different types of machines.

Machines 110 and 120 may include on-board systems 114 and 124, respectively. On-board systems 114 and 124 may provide a combination of hardware and software components for processing data collected from machines 110 and 120. Further, on-board systems 114 and 124 may communicate data collected from machines 110 and 120 to other systems. On-board systems 114 and 124 are discussed below in further detail with regard to FIG. 2.

Furthermore, machine 110 may include antenna 112 and machine 120 may include antenna 122. Antenna 112 and antenna 122 may communication via radio wave transmission with radio tower 130. Machine 110 and machine 120 may also communicate with each other via radio wave transmission via antenna 112 and antenna 122. Communication between machines 110, 120, and radio tower 130, may occur according to any appropriate communication protocol. Although only a specific number of machines are shown, environment 100 may include any number and types of such machines.

Communication between machines 110 and 120, and radio tower 130, may include transmitting and/or receiving data from a monitoring service available over a network via tower 130. For example, machine 110 may communicate with radio tower 130 via antenna 112. An exemplary network is discussed below in further detail with regard to FIG. 3. The monitoring service may represent a system that is located remotely from machines 110 and 120 and may connect to machines 110 or 120 through wireline or wireless data links. Further, the monitoring service may be a computer system including known computing components, such as one or more processors, software, a display, and interface devices that operate collectively to perform one or more processes. For example, machine 110 may transmit data to radio tower 130. Radio tower 130 may then, in turn, relay the data via a network to the monitoring service.

The data transmitted from machine 110 to the monitoring service may include parameter data, site information, operator identifiers, fault codes, stress readings, application information, hours of operation, rpm readings, temperature readings, location data (e.g., GPS coordinates, work site information, etc.), etc. The monitoring service may store the data and/or use the data to calculate a depreciation value of the machine. The depreciation value may specify a current estimated value of the machine or the monitoring service may calculate an estimated depreciation value for the end of the lease term based on historical data. For example, using historical data, the monitoring service may estimate a depreciation value for the machine should the machine be used in a manner that is consistent with observed trends. The monitoring service may then compare the depreciation value with the estimated value of the machine based on the application agreement. When a customer has excessively used the machine or used the machine in a manner that is inconsistent with the application agreement, and thereby decreased the value of the machine more than expected, the monitoring service may inform a customer leasing the machine of the overuse and penalties that might be charged pursuant to the application agreement. Further, the monitoring service may indicate that the customer may renegotiate the agreement in the event that the customer requires use of the machine at the current usage rate.

Figure 2:
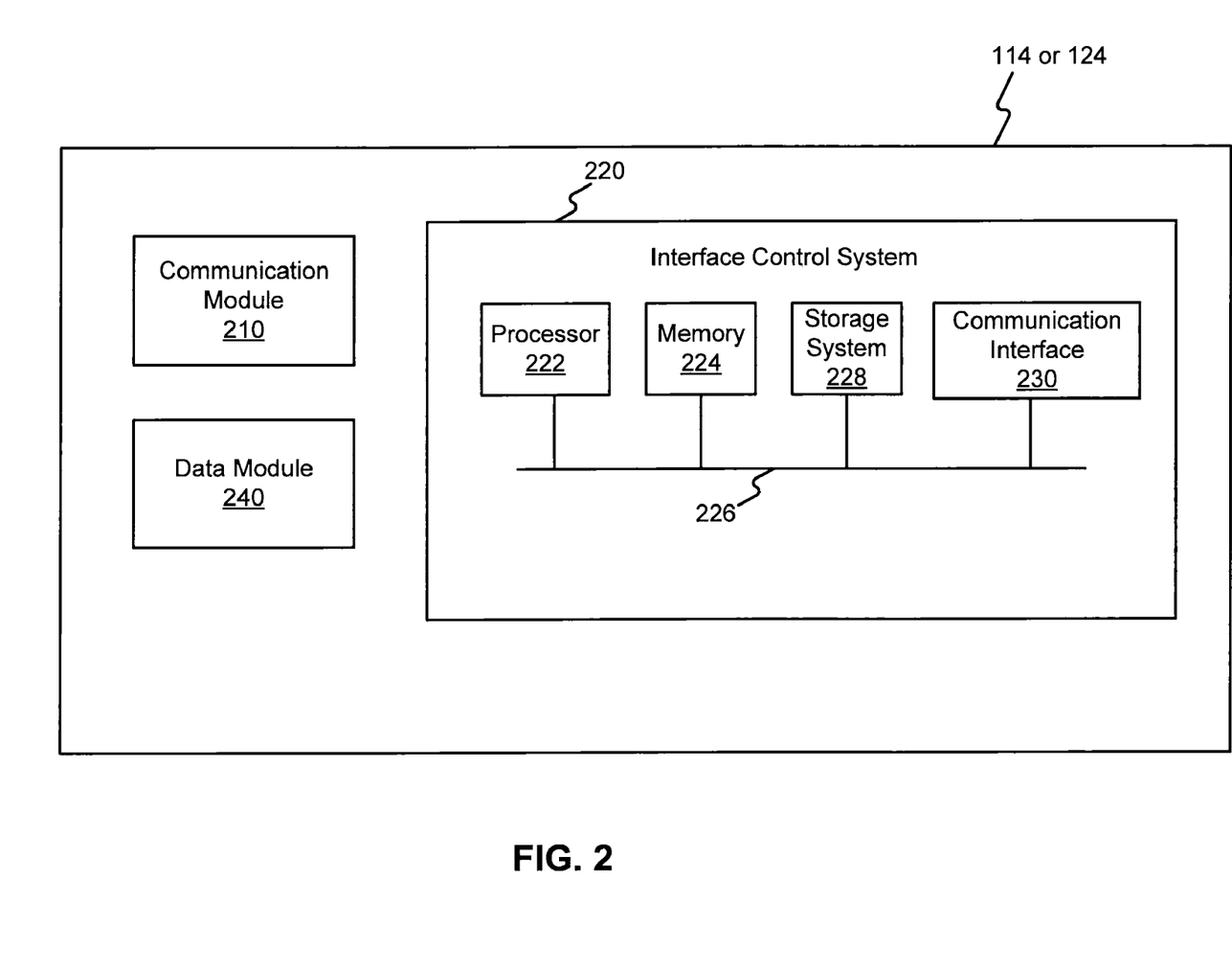
FIG. 2 shows an exemplary block diagram of an on-board system of a machine, consistent with an embodiment.

FIG. 2 shows an exemplary block diagram of on-board system 114 of machine 110, consistent with one disclosed embodiment. On-board system 114 may represent a system of one or more on-board modules, interface systems, data links, and other types of components that perform machine processes within machine 110, and may communicate with other on-board systems of machine 110. As shown in FIG. 2, on-board system 114 may include a communication module 210, an interface control system 220, and a machine data module 240.

Communication module 210 represents one or more devices that is configured to facilitate communications between machine 110 and off-board systems, such as a monitoring service. Communication module 210 may include hardware and/or software that enables the module to send and/or receive data messages through wireline or wireless communications. Communication module 210 may also interact with antenna 112 for facilitating wireless communications with an off-board system. Further, off-board systems, such as a monitoring service, may send and receive data to and from communication module 210. Wireless communications may include satellite, cellular, infrared, and any other type of wireless communication that enables machine 110 to wirelessly exchange information with an off-board system. For example, machine 110 may wirelessly exchange information with radio tower 130, which may in turn transmit information over a network to a monitoring service.

Interface control system 220 may include various computing components used to perform certain functions consistent with the requirements of a particular embodiment. To do so, interface control system 220 may include one or more processors and memory devices. For example, interface control system 220 may include a digital core that includes the logic and processing components used by interface control system 220 to perform interface, communications, software update functionalities, and software driver selection. In one embodiment, the digital core may include one or more processors and internal memories. The memories may represent one or more devices that temporarily store data, instructions, and executable code, or any combination thereof, used by a processor. Further, the memories may represent one or more memory devices that store data temporarily during operation of interface control system 220, such as a cache memory, register device, buffer, queuing memory device, and any type of memory device that maintains information. The internal memory used by interface control system 220 may be any type of memory device, such as flash memory, Static Random Access Memory (SRAM), and battery backed non-volatile memory devices.

In operation, the digital core may execute program code to facilitate communications between on-board modules and/or off-board systems. In one embodiment, interface control system 220 may include software that performs protocol conversion operations for converting information associated with one type of data link to another. The conversion operations may include protocol translation and tunneling features.

Interface control system 220 may include a processor 222, a memory 224 (e.g., RAM), and a bus 226, which couples processor 222 and memory 224 to a storage system 228 and a communication interface 230. Storage system 228 may include one or more memory devices (e.g. RAM, ROM, magnetic disks, optical storage disks, etc.). Additionally, storage system 228 may include memory controller components, such as an I/O controller that facilitates access to and from storage system 228.

Communication interface 230 may be one or more interface components (e.g., software, hardware, or a combination thereof) that transmits and receives information from and to interface control system 220. In addition to performing information transfer between machine 110 and off-board data links (e.g., wired and/or wireless networks), interface control system 220 may be configured to perform one or more remote machine control processes, such as obtaining machine data from another machine, for example.

Machine data module 240 may receive, store, and transmit data collected from one or more on-board systems of machine 110. For example, machine data module 240 may receive data that is output from an operator display device, an Engine Control Module (ECM), a power system control module, a Global Positioning System (GPS) interface device, an attachment interface that connects to one or more sub-components, and any other type of device, system, or module that machines 110 and 120 may include to facilitate operations of the machines during run time or non-run time conditions. The data that is received by machine data module 240 may include parameter data, site information, operator identifiers, fault codes, stress readings, application information, hours of operation, rpm readings, temperature readings, location data (e.g., GPS coordinates, work site information, etc.), etc.

Machine data module 240 may store received data locally in machine 110 or machine 120 and/or may transmit the data off-board the machine via communication module 210. For example, machine data module 240, via communication module 210, may transmit data to a monitoring service. An exemplary system including a monitoring service is discussed in further detail with respect to FIG. 3. Further, although a certain number of modules are shown in FIG. 2 for purposes of illustration, one of ordinary skill in the art will recognize that the number of modules may vary and the functionality provided by one module may be provided by one or more modules.

Figure 3:
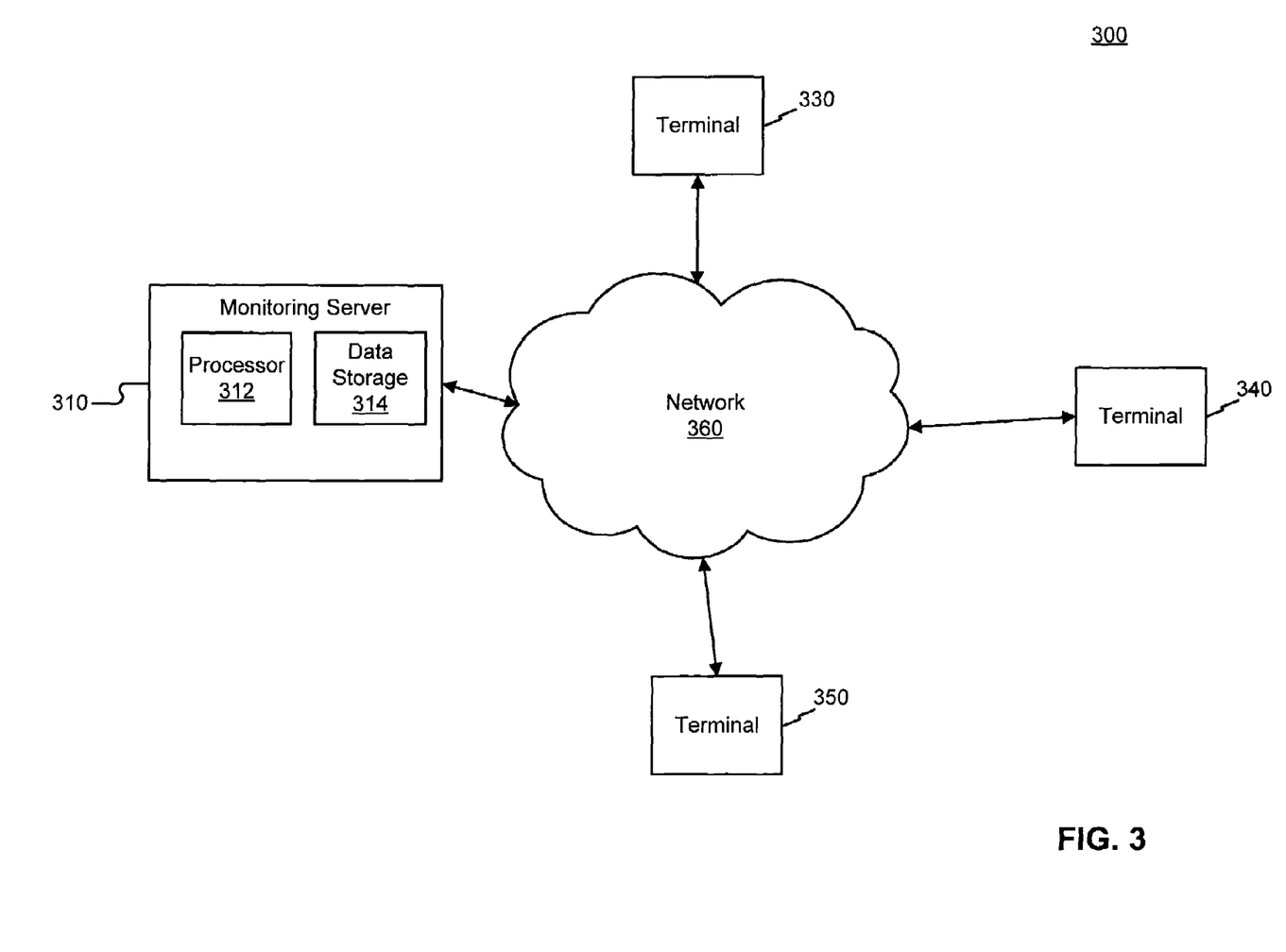
FIG. 3 shows an exemplary system for monitoring use of a machine, consistent with an embodiment.

FIG. 3 shows an exemplary system 300 for monitoring of a machine by a monitoring service, consistent with one disclosed embodiment. As shown in system 300, monitoring server 310, and terminals 330, 340, and 350 are connected to a network 360. One of skill in the art will appreciate that although three terminals are depicted in FIG. 3, any number of terminals may be provided. Further, one of ordinary skill in the art will recognize that functions provided by one or more components of system 300 may be combined.

Network 360 provides communications between the various entities in system 300, such as monitoring server 310 and terminals 330-350. In addition, monitoring server 310 and terminals 330-350 may access legacy systems (not shown) via network 360, or may directly access legacy systems and/or databases. Network 360 may be a shared, public, or private network, may encompass a wide area or local area, and may be implemented through any suitable combination of wired and/or wireless communication networks. Furthermore, network 360 may comprise a local area network (LAN), a wide area network (WAN), an intranet, or the Internet.

Monitoring server 310 may comprise a general purpose computer (e.g., a personal computer, network computer, server, or mainframe computer) having a processor 312 that may be selectively activated or reconfigured by a computer program. Monitoring server 310 may also be implemented in a distributed network. Alternatively, monitoring server 310 may be specially constructed for carrying out methods consistent with a particular embodiment. Furthermore, monitoring server 310 may include a data storage 314 for storing program modules that collect data and process the data in order to determine a depreciation value of a machine. Further, the program modules may include functionality for transmitting messages to customers of estimated penalties for overuse of a machine and/or to renegotiate a lease rate for a machine being overused. Program modules are discussed in further detail with respect to FIG. 4.

Terminals 330-350 may be any type of device for communicating with monitoring server 310 over network 360. Further, terminals 330-350 may communicate directly or indirectly with machines 110 and 120 via wirelink or wireless networks. For example, terminals 330-350 may be personal computers, handheld devices, or any other appropriate computing platform or device capable of exchanging data with network 360 and/or machines 110 and 120. Terminals 330-350 may each include a processor, a data storage, and an interface card for direct connection to a port of machines 110 and 120. Terminals 330-350 may be radio towers in communication with one or more other radio towers comprising a wireless network. For example, terminal 330 may wirelessly communicate with radio tower 130, and in turn, machine 110.

Further, terminals 330-350 may execute program modules that provide one or more graphical user interfaces (GUIs) for interacting with network resources to transmit and/or receive data from machines 110 and 120 and/or monitoring server 310. Users may access data provided by monitoring server 310 via network 360 through a web browser or software application running on, for example, any one of terminals 330-350. For example, a web portal may include options for allowing a user to log onto a secure site provided by monitoring server 310 by supplying credentials, such as a username and a password. Once logged onto the site, the web portal may display a series of screens prompting the user to make various selections for viewing data collected from a machine, as well as reports and any messages transmitted to or from a customer leasing the machine. Since some disclosed embodiments may be implemented using an HTTPS (hypertext transfer protocol secure) environment, data transfer over a network, such as the Internet, may be done in a secure fashion.

In some embodiments, a web interface generated by monitoring server 310 that is displayed to users of terminals 330-350 may provide various options. For example, a user may use terminal 340 to retrieve data from machine 110, generate reports summarizing historical data collected from machine 110, or review messages sent to customers in the event that the machine has been used in a fashion that is inconsistent with the application agreement. Further, a user at terminal 340 may respond to customer inquiries, for example.

Figure 4:
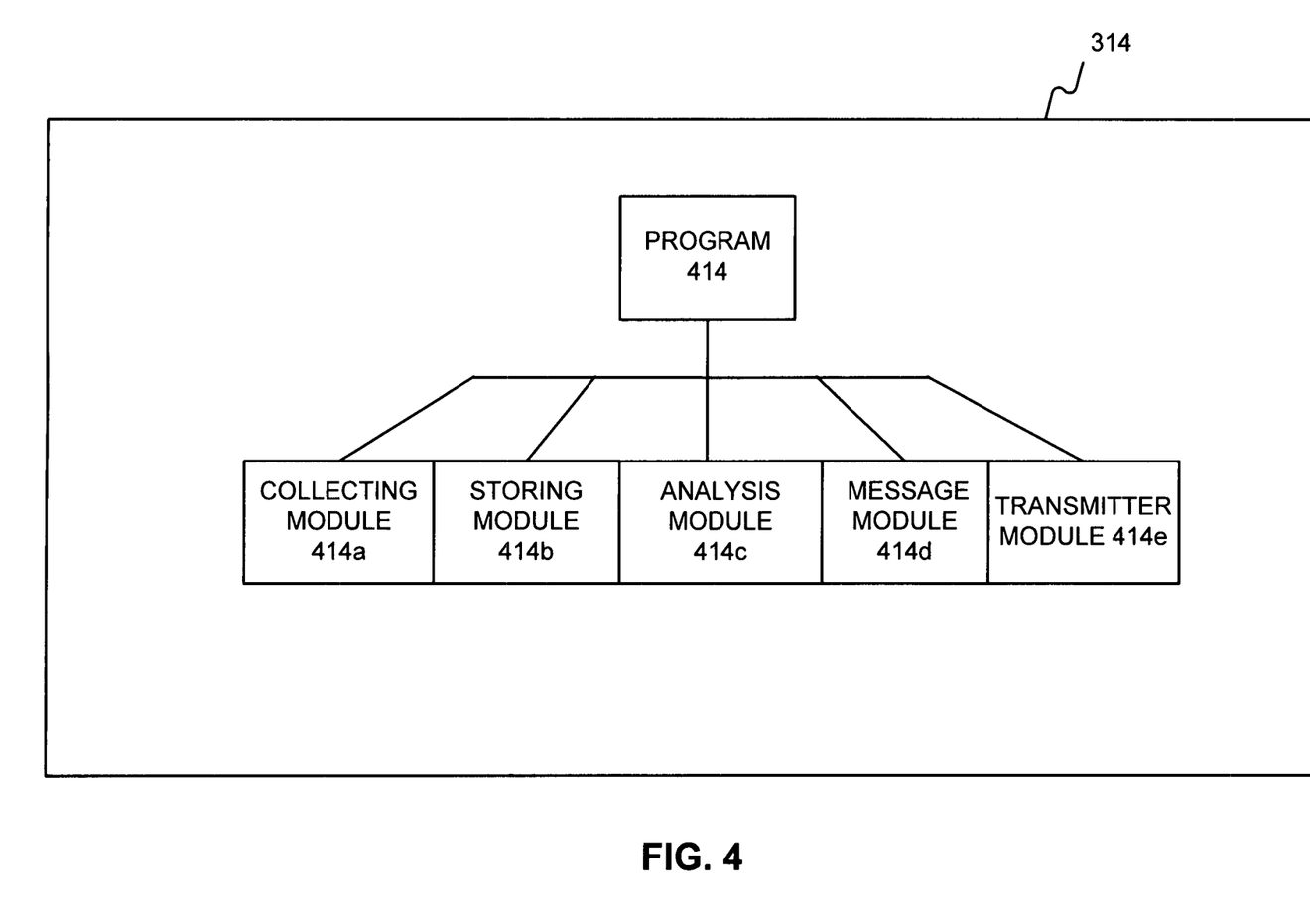
FIG. 4 shows an exemplary software architecture for monitoring a machine and determining a depreciation value of the machine, consistent with an embodiment.

FIG. 4 shows an exemplary software architecture for monitoring a machine and determining a depreciation value of the machine, consistent with a disclosed embodiment. The software architecture may be stored in data storage 314 of monitoring server 310 as shown in FIG. 3, for example.

In one embodiment, data storage 314 stores instructions of program 414, which when executed, perform a process to monitor a machine and determine a depreciation value of the machine. To do so, program 414 may include instructions in the form of one or more software modules 414a-414e. Software modules 414a-414e may be written using any known programming language, such as C++, XML, etc., and may include a collecting module 414a, a storing module 414b, an analysis module 414c, a message module 414d, and an transmitter module 414e.

Collecting module 414a may receive data from machine 110 and/or machine 120. For example, collecting module 414a may regularly transmit a request for data to a machine at a predetermined time interval, such as hourly, daily, weekly, monthly, etc. The request may be processed by machine data module 240, which may transmit the requested data. Further, the request may initiate a session between a machine and monitoring server 310 in which data is sent in a real-time fashion during the duration of the session. The session may last as long as necessary, and in some implementations, may continuously transmit real-time data from a machine.

Storing module 414b may store data collected from a machine to data storage 314, for example. Data may be stored with an appropriate identifier in a database structure, such as a machine identification number, or any other appropriate identifier, so that the data is related to a particular machine. The stored data may include parameter data, site information, operator identifiers, fault codes, stress readings, application information, hours of operation, rpm readings, temperature readings, location data (e.g., GPS coordinates, work site information, etc.), etc. Further, storing module 414b may store data at the direction of collection module 414a on a periodic basis in order to accumulate historical data for a machine throughout a lease term.

Analysis module 414c may analyze data that has been stored by storing module 414b or may analyze data as it is received in real-time. For example, analysis module 414c may include program functionality for evaluating whether a machine has been used in excess of an application agreement. To do so, analysis module 414c may retrieve agreement parameters relating to the application agreement from data storage 314. The agreement parameters may indicate a limit of operation hours on a daily, monthly, or yearly basis. Further, the agreement parameters may indicate that the application for which the machine is to be used, such as mining, construction, or a type of environment, for example, or any other conditions of the application agreement.

Analysis module 414c may project based on a number of accumulated hours of operation an expected number of hours of operation for the entire lease term. Analysis module 414c may also use machine data such as parameter data, site information, operator identifiers, fault codes, stress readings, rpm readings, temperature readings, and location data (e.g., GPS coordinates, work site information, etc.), for example, to determine whether the machine is being used in a manner that is inconsistent with application agreement.

Further, analysis module 414c may determine an estimated depreciation value of the machine based on any misuse and/or excessive use, and/or any penalties for misuse and/or the excessive use. For example, should the depreciation value differ by a threshold (e.g., 3% or more than the expected value based on the terms of the application agreement), then analysis module 414c may determine an amount of a penalty the customer may incur should use of the machine for the remainder of the lease term be consistent with the observed pattern of use. In other embodiments, analysis module 414c may determine an amount of a penalty the customer may incur should use of the machine for the remainder of the lease term be consistent with the observed pattern of use regardless of a threshold comparison to an expected value.

In the event that a customer has overused a machine and incurred a penalty for overuse and/or for using the machine inconsistent with the application agreement, analysis module 414c may determine a new lease rate for the remainder of the term. If accepted by the customer, the new lease rate may be charged for the remainder of the term in lieu of a penalty.

In the event that the customer has disabled communications equipment on the machine, analysis module 414c may determine any penalties for overuse based on historical data. For example, collecting module 414a may be unable to obtain current data for a machine. In such a situation, analysis module 414c may project a depreciation value based on historical data stored for the machine, as well as data from similar or non-similar machines that may be operating in the same work site or leased by the same customer. Based on the historical data for the machine and/or current use data of the other machines, analysis module 414c may estimate the value of the missing defaulted machine.

Message module 414d may generate an appropriate message based on the results determined by analysis module 414c. The message may indicate, for example, that the customer has used the machine a certain number of hours over the agreed to limit and/or that the customer has used the machine inconsistent with the application agreement and owes a penalty. The message may further indicate an amount of a penalty that the customer is estimated to owe should the customer continue using the machine in a similar fashion for the remainder of the lease term.

For example, a customer has agreed to operate a machine 12,000 hours a year (an average of 1,000 hours a month) during a one year lease. Analysis module 414c has determined that for the first six months of the lease term, the machine has been operated for 9,000 hours total (an average of 1,500 hours per month). Should the customer continue to operate the machine at an average rate of 1,500 hours for the remaining six months, the customer is estimated to exceed the number of hours specified in the operating agreement by 6,000 hours. The customer will then incur a penalty for those 6,000 additional hours. Accordingly, message module 414d may generate a message indicating that instead of incurring the penalty for an excess 6,000 hours at the end of the lease term, the customer may pay a renegotiated lease rate for the remainder of the lease term. The renegotiated lease rate, in the present example, will allow the customer to operate the machine an additional 6,000 hours during the lease term without incurring a penalty. The renegotiation lease rate may be supplied in the message or sent to the customer upon the customer's request. One of ordinary skill in the art will recognize that the above is only an example and other variations may be performed.

Transmitter module 414e may format and transmit messages generated by message module 414d for transmission from monitoring server 310 to customers over network 360. For example, messages may be sent to the customer based on a predetermined message format specified by the customer or based on a default setting. For example, transmitter module 414e may send an e-mail message, a text message, a voice message, etc. In other embodiments, transmitter module 414e may communicate the message to an intermediary, such as the financial entity that leased the machine to the customer, and the financial entity may then format the response as desired prior to transmission to the customer.

Although program modules 414a-414e have been described above as being separate modules, one of ordinary skill in the art will recognize that functionalities provided by one or more modules may be combined. Furthermore, one of ordinary skill in the art will recognize that program 414 may reside in monitoring server 310, machines 110 and 120, or in any device connected directly or wirelessly to machine 110 and/or machine 120.

Figure 5:
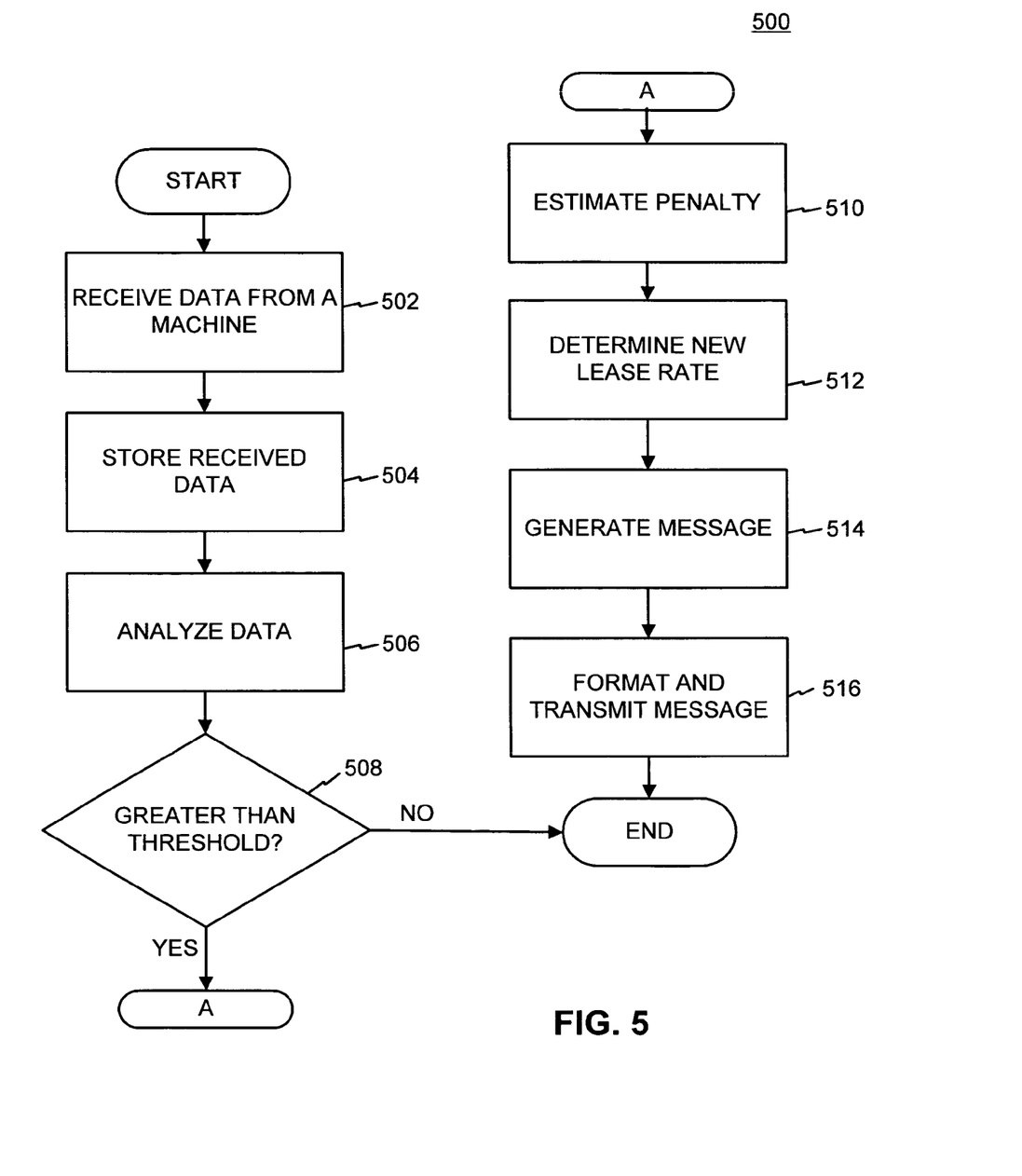
FIG. 5 is a flow diagram of an exemplary method for monitoring a machine and determining a depreciation value of the machine, consistent with an embodiment.

Referring now to FIG. 5, a flow diagram 500 is provided of an exemplary method for monitoring a machine and determining a depreciation value of the machine, consistent with a disclosed embodiment. For example, the method may implement processes according to program modules 414a-414e.

At the start of the process, in step 502, monitoring server 310 may receive data from a machine. For example, collecting module 414a may receive machine data from machine 110 and/or machine 120 per a request transmitted by collecting module 414a, or based on a predetermined schedule for transmitting data. The process then proceeds to step 504.

In step 504, monitoring server 310 may store the received data. For example, storing module 414b may store data collected from a machine to data storage 314. The stored data may include parameter data, site information, operator identifiers, fault codes, stress readings, application information, hours of operation, rpm readings, temperature readings, location data (e.g., GPS coordinates, work site information, etc.), etc. The process then proceeds to step 506.

In step 506, monitoring server 310 may analyze the machine data that has been received up to that point in time. Analysis of the data may also occur based on a predetermined schedule, such as hourly, daily, weekly, monthly, yearly, etc. For example, analysis module 414c may analyze data that has been stored by storing module 414b or may analyze data as it is received in real-time. Further, analysis module 414b may use historical data if current data is no longer available from the machine.

To evaluate whether a machine has been used in excess of an application agreement, analysis module 414c may retrieve agreement parameters relating to the application agreement from data storage 314, for example. The agreement parameters may indicate a limit of operation hours on a daily, monthly, or yearly basis, and/or may indicate the application for which the machine is to be used, such as mining, construction, or may identify a type of environment.

Further, in step 506, analysis module 414c may estimate an operating condition of the machine. For example, the operating condition may be an estimated number of hours of operation for the entire lease term or may be an estimated status of a use of the machine based on other data, such as parameter data, site information, operator identifiers, fault codes, stress readings, application information, rpm readings, temperature readings, location data (e.g., GPS coordinates, work site information, etc.), etc. Further, analysis module 414c may analyze the other data for inconsistencies against the operating agreement. Accordingly, analysis module 414c may then determine an estimated depreciation value of the machine based on any excessive use and/or any misuse. Step 506 is discussed in further detail in relation to FIG. 6. The process then proceeds to step 508.

In step 508, analysis module 414c may determine whether the depreciation value differs by a threshold (e.g., a value that is less than 3% of the total expected value based on the terms set in the application agreement). If the depreciation value does differ by a value that is greater than the threshold, then the process proceeds to step 510. However, if the depreciation value does not differ by a value that is greater than the threshold, then the process ends. For example, the threshold could be set so that any difference between the total expected value and the estimated depreciation value will trigger the process to proceed to step 510.

In step 510, analysis module 414c may determine an amount of a penalty the customer may incur should use of the machine for the remainder of the lease term be consistent with the observed pattern of use. The process then proceeds to step 512.

In step 512, since the customer has overused the machine and incurred a penalty for overuse and/or for using the machine inconsistent with the application agreement, analysis module 414c may determine a new lease rate for the remainder of the term. The process proceeds to step 514.

In step 514, message module 414d may generate an appropriate message based on the results determined by analysis module 414c. The message may indicate, for example, that the customer has used the machine a certain number of hours over the agreed upon limit, for example, and/or that the customer has used the machine inconsistent with the application agreement and owes a penalty. The message may further indicate an amount of a penalty that the customer is estimated to owe should the customer continue using the machine in a similar fashion for the remainder of the lease term. The process proceeds to step 516.

In step 516, transmitter module 414e may format the message generated by message module 414d based on the customer's preferred mode of contact or based on a default setting. For example, transmitter module 414e may format a message as an e-mail message, a text message, a voice message, etc. Transmitter module 414e may then transmit a formatted message to the customer over network 360 or may instead transmit a message to a third party, such as a financial entity, for subsequent transmission to the customer. The process then ends.

As one of ordinary skill in the art will appreciate, one or more of the above steps may be optional and may be omitted from implementations in certain embodiments. Further, in an alternative implementation, one or more of the above steps may be performed by on-board system 114 instead of monitoring server 310, for example.

Figure 6:
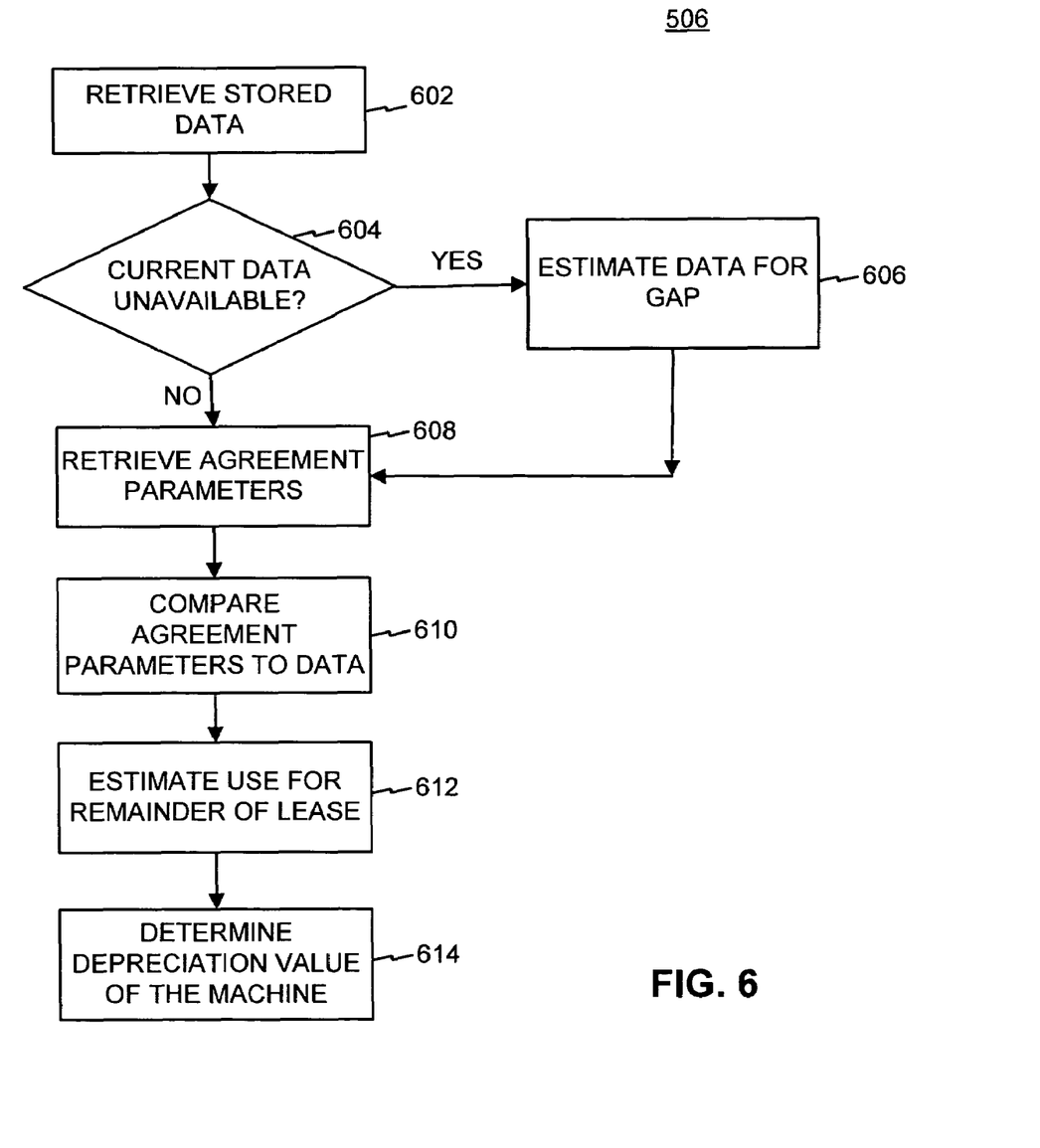
FIG. 6 is a flow diagram of an exemplary method for analyzing data from a machine consistent with a step of FIG. 5.

FIG. 6 is a flow diagram of an exemplary method for analyzing data from a machine consistent with step 506 of FIG. 5. The method may implement processes according to analysis module 414c, for example.

At this stage of the process, monitoring server 310 may analyze the data that has been received up to that point in time from a machine. For example, monitoring server 310 may retrieve data for a machine from a data storage. (Step 602.) Next, monitoring server 310 may determine whether the retrieved data does not include current data. (Step 604.) Current data may be determined by accessing whether the latest data is beyond a certain age. For example, if the data is older than a predetermined period of time (i.e., a predetermined number of hours, days, months, etc.) monitoring server 310 may decide that current data is unavailable and that there is a significant gap in the data. For example, a period of one month may be set as the predetermined period of time. Accordingly, it may then be necessary to estimate usage of the machine for the gap. Thus, if monitoring server 310 determines that current data is unavailable, the process proceeds to step 606. However, if monitoring server 310 determines that current data is available, the process proceeds to step 608.

In step 606, monitoring server 310 estimates data for the gap in time between the last available data and the present date. For example, monitoring server 310 may interpolate or estimate current data of the machine based on its use trends. To do so, the system or method may input machine data from similar or non-similar machines (in or not in default status) that may be operating in the same work site or leased by the same customer. The process then proceeds to step 608.

In step 608, monitoring server 310 may retrieve agreement parameters from data storage 314 or may access a remote system via network 360. The agreement parameters may specify terms of the application agreement and, accordingly, may indicate a limit of operation hours on a daily, monthly, or yearly basis, and/or may indicate the application for which the machine is to be used, such as mining, construction, or may identify a type of environment. The process then proceeds to step 610.

In step 610, monitoring server 310 may compare the agreement parameters to data collected and processed from the machine. For example, an agreement parameter may specify that the machine cannot be used in a particular geographic location. That agreement parameter may be compared to GPS data indicating a location of the machine. Further, an agreement parameter may specify certain operation or maintenance schedules of the machine, such as changing certain fluids at particular time periods. Based on data collected from the machine, such as temperature readings, rpm readings, and/or stress readings, for example, a violation of such an agreement parameter may be determined. The process then proceeds to step 612.

In step 612, monitoring server 310 may project based on a number of accumulated hours of operation (included an estimate determined in step 606, if any) an estimated number of hours of operation for the entire lease term. The process then proceeds to step 614.

In step 614, monitoring server 310 may determine an estimated depreciation value of the machine based on any excessive use and/or any misuse. For example, monitoring server 310 may store tables containing expected depreciation values based on certain conditions, such as operation hours and/or other conditions, such as fault codes, stress readings, hours of operation, rpm readings, temperature readings, etc. Expected conditions may be compared against collected data and projected trends in order to estimate whether the machine has been misused.

INDUSTRIAL APPLICABILITY

Systems and methods disclosed herein may receive data from a machine indicating an operational condition and status of the machine. The data may include parameter data, site information, operator identifiers, fault codes, stress readings, application information, hours of operation, rpm readings, temperature readings, and location data (e.g., GPS coordinates, work site information, etc.), for example. When a customer has excessively used the machine or used the machine in a manner that is inconsistent with the application agreement, the system or method may transmit a notification of the overuse to a customer leasing the machine. The notification may indicate that continued overuse for the remainder of the lease term may result in a financial penalty being charged pursuant to the application agreement. Further, the system or method may provide functionality for renegotiating the lease rate in the event that the customer requires use of the machine at the current usage rate.

For example, the disclosed systems and methods may use current and historical use data of a given machine in order to estimate that the machine will likely be used a certain number of hours in excess of an agreed number of hours specified in the application agreement. Based on the data collected from the machine, the system or method may execute a process that determines a trend or estimated future use in relation to the end of the lease term. After determining the estimated future use, the system or method may notify the customer of the estimated overuse of the leased machine and the ramifications of the estimated overuse. Further, the system or method may analyze the collected data in order to determine whether the machine has been used in a manner that is inconsistent with other terms of the application agreement. For example, the system or method may determine whether the machine is being used in an improper location based on GPS data.

When the disclosed system or method determines that a machine is expected to be overused, the entity leasing the machine may negotiate or educate the customer with regard to the machine's use. For example, the entity may ask the customer if the current level of use of the machine is what the customer actually needs and whether the customer intends to keep using the machine as historically recorded. If the customer indicates that the machine is needed at the current usage rate, the entity may renegotiate the application and lease agreement to address the customer's actual needs for the leased machine. This may result in a lower cost for the customer in relation to the estimated penalty that may be assessed after the end of the lease term. For instance, the customer may agree to pay for additional hours in a renegotiated lease as opposed to paying a penalty at the end of the lease term.

In other aspects, when real time data is unavailable, the system or method may use historical machine data to estimate a value of a machine. For example, a machine may be configured to send periodic reports of machine use. However, when a machine is in a default status (i.e., its lease is in default), the customer may attempt to disable communication mechanisms. In such situations, the system or method may use the historical machine data previously collected to interpolate or estimate a current value of the machine based on its use trends. For example, the system or method may input machine data from similar or non-similar machines (in or not in default status) that may be operating in the same work site or leased by the same customer. Based on the historical data for the machine or current use data of the other machines, the system or method may estimate the value of the missing defaulted machine. Further, the system or method may send a communication to the customer informing the customer of an estimated penalty for overuse.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as computer-readable storage media, for example, hard disks, floppy disks, CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A system for monitoring a machine, the system comprising:
   a monitoring server in communication with the machine, wherein the monitoring server receives data from the machine, estimates, based on the received data, an operating condition of the machine, and estimates a depreciation value of the machine based on the operating condition, and
   wherein the monitoring server determines whether the depreciation value is greater than a threshold and, when the depreciation value is greater than the threshold, determines an amount of a penalty, and
   wherein the monitoring server determines a new lease rate for the remainder of a lease term, wherein if a customer leasing the machine accepts the new lease rate, the penalty will not be incurred.

2. The system of claim 1, wherein the received data includes one or more of parameter data, site information, operator identifiers, fault codes, stress readings, application information, hours of operation, rpm readings, temperature readings, and location data.

3. The system of claim 1, wherein the operating condition is a number of hours of operation or a use of the machine.

4. The system of claim 1, wherein the monitoring server generates a message to a customer leasing the machine that indicates the penalty.

5. The system of claim 1, wherein the monitoring server generates a message to the customer that indicates the new lease rate.

6. A method for monitoring a machine, the method comprising:
   receiving, over a network, data from the machine;
   estimating, based on the received data, an operating condition of the machine;
   estimating a depreciation value of the machine based on the operating condition;
   determining whether the depreciation value is greater than a threshold;
   when the depreciation value is greater than the threshold, determining an amount of a penalty; and
   determining a new lease rate for the remainder of a lease term, wherein if a customer leasing the machine accepts the new lease rate, the penalty will not be incurred.

7. The method of claim 6, wherein the received data includes one or more of parameter data, site information, operator identifiers, fault codes, stress readings, application information, hours of operation, rpm readings, temperature readings, and location data.

8. The method of claim 6, wherein the operating condition is a number of hours of operation or a use of the machine.

9. The method of claim 6, further comprising:
   generating a message to a customer leasing the machine that indicates the penalty.

10. The method of claim 6, further comprising:
    generating a message to the customer that indicates the new lease rate.

11. A computer-readable storage medium storing instructions for performing a method executed by a processor to monitor a machine, the method comprising steps performed by the processor of:
    receiving, over a network, data from the machine;
    estimating, based on the received data, an operating condition of the machine;
    determining whether the depreciation value is greater than a threshold;
    when the depreciation value is greater than the threshold, determining an amount of a penalty owed by a customer leasing the machine; and
    determining a new lease rate for the remainder of a lease term, wherein if a customer leasing the machine accepts the new lease rate, the penalty will not be incurred.

12. The computer-readable storage medium of claim 11, wherein the received data includes one or more of parameter data, site information, operator identifiers, fault codes, stress readings, application information, hours of operation, rpm readings, temperature readings, and location data.

13. The computer-readable storage medium of claim 11, wherein the operating condition is a number of hours of operation or a use of the machine.

14. The computer-readable storage medium of claim 11, the steps performed by the processor further comprising:
    generating a message to the customer that indicates the penalty.

* * * * *